No. 771,215. PATENTED SEPT. 27, 1904.
W. G. SOULE.
PLATE GLASS CLAMP.
APPLICATION FILED JUNE 24, 1904.
NO MODEL.

Witnesses:
H. L. Robbins
E. Batchelder

Inventor:
W. G. Soule
By Knight Brown Quinby
Attys.

No. 771,215. Patented September 27, 1904.

UNITED STATES PATENT OFFICE.

WILLIAM G. SOULE, OF NEWTON, MASSACHUSETTS.

PLATE-GLASS CLAMP.

SPECIFICATION forming part of Letters Patent No. 771,215, dated September 27, 1904.

Application filed June 24, 1904. Serial No. 213,955. (No model.)

*To all whom it may concern:*

Be it known that I, WILLIAM G. SOULE, of Newton, in the county of Middlesex and State of Massachusetts, have invented certain new and useful Improvements in Plate - Glass Clamps, of which the following is a specification.

This invention has for its object to provide a simple and effective device for securing together the adjacent edges of two plates or panes of glass angularly arranged, as in show-windows, show-cases, &c., the particular object of the invention being to enable two angular clamping members, one having a reentrant inner face and the other a salient outer face, to be held with a yielding pressure against the outer and inner surfaces of two plates of glass which are arranged to meet and form an angle.

The invention consists in the improved device which I will now proceed to describe and claim.

Figure 1:
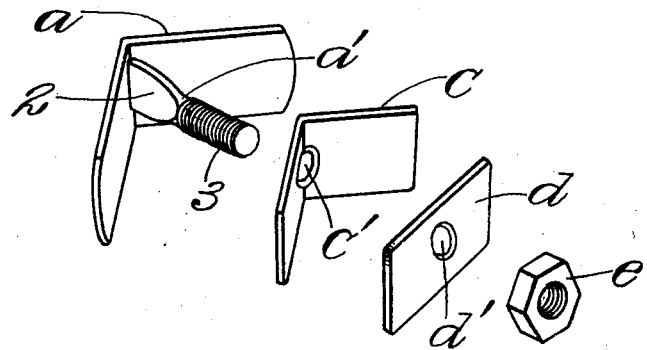
Figures 2, 3:
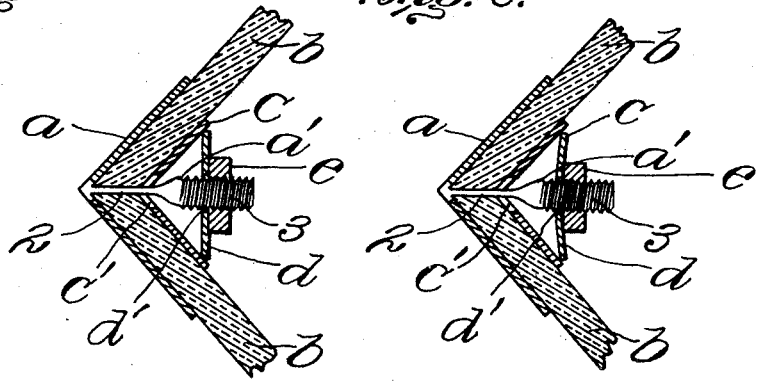

Of the accompanying drawings, forming a part of this specification, Figure 1 represents a perspective view showing the parts or members of my improved clamp separated from each other. Fig. 2 represents a sectional view showing the clamp engaged with two glass plates. Fig. 3 represents a view similar to Fig. 2, illustrating the yielding character of my improved clamp.

The same characters of reference indicate the same parts in all the figures.

In the drawings, $a$ represents an outer angular clamping member having a reëntrant inner face formed to bear on the outer surfaces of two glass plates $b\ b$, which are angularly arranged, the adjacent edges of said plates being beveled and opposed to each other. Projecting inwardly from the apex of the member $a$ is a shank $a'$, having a thin flattened portion 2, adapted to be inserted between the opposed edges of the glass plates, and an end portion 3, adapted to adjustably engage the follower hereinafter described, said end portion being preferably screw-threaded. The shank $a'$ may be affixed to the member $a$ in any suitable manner.

$c$ represents an inner angular clamping member having a salient outer face formed to bear on the inner surfaces of the plates $b\ b$. In the apex of the member $c$ is formed an orifice $c'$, adapted to receive the shank $a'$.

$d$ represents a resilient presser, which is composed of a relatively thin strip of suitably-resilient metal and is formed to bear at its ends against the end portions of the inner clamping member $c$, the said presser being provided with an orifice $d'$ to receive the shank $a'$.

$e$ represents a follower adapted to be adjustably engaged with the end portion 3 of the shank, said follower being preferably a nut threaded to engage the screw-thread of said end portion.

In assembling the said parts the outer member $a$ is placed upon the outer surfaces of the glass plates $b\ b$, the flattened portion 2 of the shank being inserted between the opposed edges of said plates. The inner member $c$ is then placed upon the shank with its outer face in contact with the inner surfaces of the plates $b\ b$. The presser $d$ is then placed upon the shank with its ends bearing on the end portions of the member $c$, and, lastly, the follower $e$ is applied to the end portion 3 of the shank and adjusted inwardly until it forces the presser $d$ against the inner member $c$, as shown in Fig. 2.

It will be seen that the presser $d$ constitutes a resilient connection between the follower and the inner clamping member, and therefore permits the two clamping members $a$ and $c$ to move slightly toward or from each other, as may be required, by variations in the thickness of the glass plates, due to expansion and contraction, the presser yielding or springing under the influence of the expansion of said plates, as indicated in Fig. 3.

I claim—

A plate-glass clamp comprising an outer angular clamping member having a reëntrant inner face, formed to bear on the outer surfaces of two plates, a shank affixed to and projecting inwardly from said member and adapted to be interposed between the adjacent edges of said plates, an inner angular clamping member having a salient outer face formed to bear on the inner surfaces of said plates, and an orifice to receive said shank, a resilient presser mounted loosely on the shank and bearing at its ends on the end portions of the inner clamping member, and a follower adjustably engaged with the shank and bearing on the said presser, the latter constituting a resilient connection between the follower and the inner clamping member.

In testimony whereof I have affixed my signature in presence of two witnesses.

WILLIAM G. SOULE.

Witnesses:
H. L. ROBBINS,
R. BULLOCK.